No. 799,087. PATENTED SEPT. 12, 1905.
W. E. PORTER.
STEM WINDING AND STEM SETTING WATCH.
APPLICATION FILED DEC. 6, 1904.
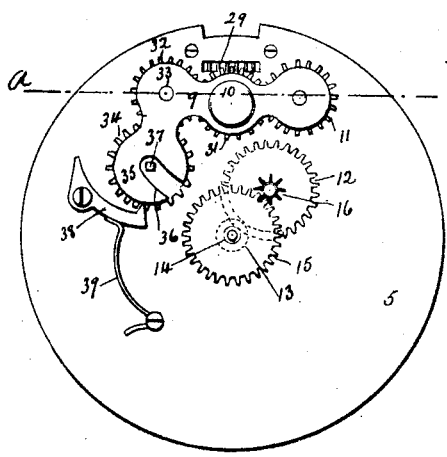
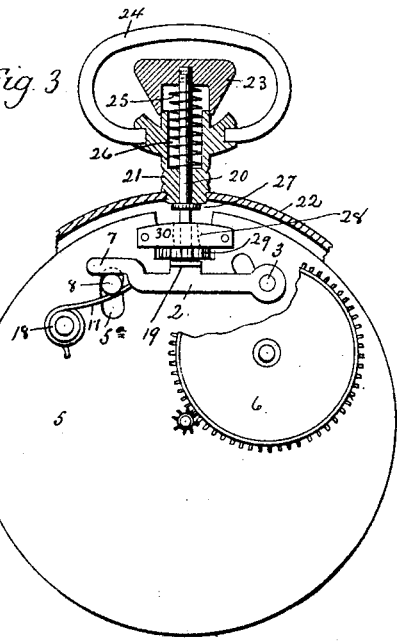
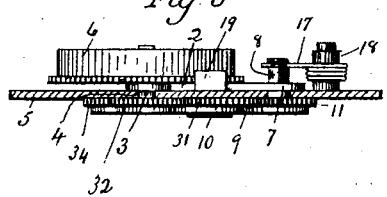
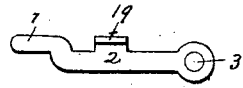
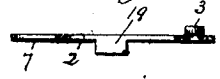
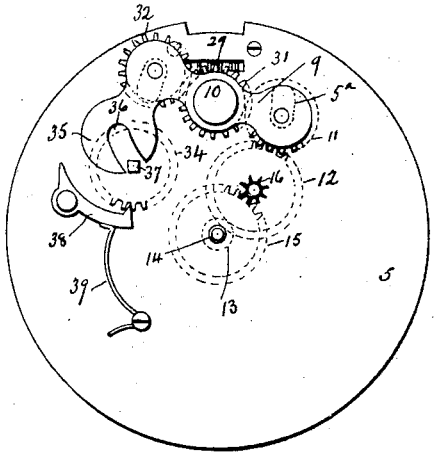
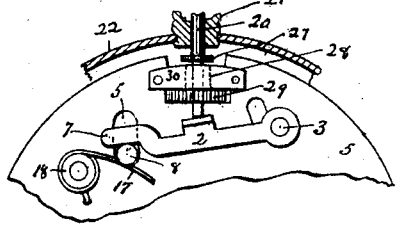

UNITED STATES PATENT OFFICE.

WILSON E. PORTER, OF NEW HAVEN, CONNECTICUT, ASSIGNOR TO THE NEW HAVEN CLOCK CO., OF NEW HAVEN, CONNECTICUT, A CORPORATION.

STEM-WINDING AND STEM-SETTING WATCH.

No. 799,087.        Specification of Letters Patent.        Patented Sept. 12, 1905.

Application filed December 6, 1904. Serial No. 235,725.

*To all whom it may concern:*

Be it known that I, WILSON E. PORTER, a citizen of the United States, residing at New Haven, in the county of New Haven and State of Connecticut, have invented a new and useful Improvement in Stem-Winding and Stem-Setting Watches; and I do hereby declare the following, when taken in connection with the accompanying drawings and the numerals of reference marked thereon, to be a full, clear, and exact description of the same, and which said drawings constitute part of this specification, and represent, in—

Figure 1, a detached view, in front elevation, of a watch-movement containing my invention with its stem-winding and stem-setting mechanism in its normal or winding position; Fig. 2, a similar view with the stem-winding and stem-setting mechanism shown in position for setting; Fig. 3, a view showing the inside of the front movement-plate, which is stripped except as to its stem-winding and stem-setting mechanism, which is shown in position for winding; Fig. 4, a similar but less comprehensive view with its said mechanism in position for setting; Fig. 5, a partial plan view with the front movement-plate in horizontal section on the line $a\,b$ of Fig. 1; Fig. 6, a detached view in elevation of the setting-lever; Fig. 7, a plan view thereof with one end in section.

My invention relates to an improvement in stem-winding and stem-setting watches, the object being to simplify and cheapen their stem-winding and stem-setting mechanism, to improve the conditions of leverage under which the watch is placed in readiness for setting, and to facilitate the assembling of the parts.

With these ends in view my invention consists in certain details of construction and combinations of parts, as will be hereinafter described, and particularly pointed out in the claims.

In carrying out my invention I employ a long sheet-metal setting-lever 2, furnished at one end with a pivot 3, mounted in it and swaged in place and entering a pivot-hole 4, formed in the front movement-plate 5 and retained in the said pivot-hole by the spring-barrel 6, between which and the inner face of the said front movement-plate one end of the setting-lever 2 is interposed and confined, as shown by Fig. 3, though free to swing in a plane at a right angle to its pivot. Under this construction the watch, so far as the lever 2 is concerned, is very easily assembled, as the pivot 3 of the lever is not riveted down, but simply dropped into the pivot-hole 4 and the lever held in place, as stated, by the movement-plate 5 on the one hand and the spring-barrel 6 on the other. At its opposite end the lever 2 is formed with a finger 7, arranged to be engaged with the upper face of a pin or stud 8, projecting inwardly through a slot $5^a$ in the front movement-plate 5 from the setting end of an oscillating winding and setting yoke 9, secured by an ordinary shouldered rivet 10 to the front or outer face of the said plate. The said pin 8 forms a bearing for the setting-wheel 11, which when the yoke is swung into its setting position by the setting-lever 2 meshes into the minute-wheel 12, which in turn meshes into the cannon-pinion 13, located at the inner end of the minute-hand socket 14. The hour-wheel 15 is mounted upon the said socket 14 and driven by the minute-wheel pinion 16, carried by the minute-wheel 12. The dial-work above described is of ordinary construction. Normally, however, the lever 2 is held in its winding position, in which the setting-wheel 11 is out of mesh with the minute-wheel 12, by means of a spring 17, engaging with the lower face of the pin 8 and coiled upon one of the pillars 18 of the movement of the watch. The said lever 2 is also furnished with an arm 19, formed midway between its ends and bent from front to rear at a right angle to its plane. The upper face of this arm receives the thrust of the longitudinally-movable winding and setting stem 20, which is mounted in the pendant 21, which in turn is mounted in the center-ring 22 of the watchcase. The outer end of the stem 20 is threaded for the attachment of the crown 23, which is surrounded by the pendant-ring 24. The said stem 20 is normally held in its outward or winding position by means of a coiled spring 25, encircling it and located in a spring-socket 26, formed by counterboring the outer end of the pendant 21, its inner end resting upon the bottom of the socket 26 and its outer end impinging against the inner face of the crown 23 and exerting a constant effort to push the stem outward, which it will do the moment the pressure of the finger tending to push it inward is removed. The outward movement of the stem 20 under the action of the spring 25 is limited by a collar 27, located upon the stem toward the inner end thereof and engaging with the extreme inner end of the pendant 21, the stem 20 being passed outward through the pendant from the inside of the case-center 22 in assembling the watch. The inner end of the stem 20 is squared and passed through the squared hole of the hub 28 of the winding-pinion 29, which also has a squared hole through which the stem passes for engagement with the arm 19 of the lever 2, the winding-pinion 29 being secured in place by the journaling of its hub 28 in a bridge 30, secured to the inner face of the front movement-plate 5. This winding-pinion is constantly in mesh with a winding and setting wheel 31, which turns upon the shouldered stud 10 as upon a center. The wheel 31 is constantly in mesh, on the one hand, with the setting-wheel 11, carried by the yoke 9, and constantly in mesh, on the other hand, with a winding-wheel 32, mounted upon a stud 33 in the winding end of the yoke 9 and meshing into a ratchet-wheel 34, which is held in place by the downwardly-extending retaining-arm 35 of the yoke 9, this arm being formed with a clearance-slot 36 for clearing the main winding-arbor 37 during the oscillating of the yoke. The ratchet-wheel 34 is engaged by the usual pawl 38, operated by a spring 39. It will be understood, of course, that the spring-barrel 6 is mounted on the main winding-arbor 37 just mentioned.

Normally the spring 17, acting through the pin 8 and lever 2, maintains the yoke 9 in its winding position with its winding-wheel 32 meshing into the ratchet-wheel 34 and with its setting-wheel 11 out of engagement with the minute-wheel 12. To set the watch, the stem 20 is pushed inward by its crown 23 against the tension of the springs 25 and 17, whereby the lever 2 is swung on its pivot 3 and the yoke 9 swung on its stud 10, so as to disengage the winding-wheel 32 from the ratchet-wheel 34 and engage the setting-wheel 11 with the minute-wheel 12. The inward pressure upon the crown being maintained the crown is then turned one way or the other, as required for setting. Now just as soon as the inward pressure upon the crown is removed the spring 25 operates to retract the stem 20 and leave the spring 17 free and unhampered in acting through the pin 8 and lever 2 to swing the yoke 9 back into its winding position.

On account of the length of the lever 2 such a long leverage is secured that the oscillation of the yoke 9 by the winding and setting stem 20 requires less force than when a short lever is employed and imposes less strain upon the members of the mechanism. Moreover, the lever 2 is secured in place without riveting, and that expense avoided, as well as convenience of assembling and dismembering the watch secured.

Having fully described my invention, what I claim as new, and desire to secure by Letters Patent, is—

1. In a stem-winding and stem-setting watch, the combination with a movement-plate thereof, of a spring-barrel, an oscillating winding and setting yoke, a longitudinally-movable winding and setting stem and a setting-lever connected at one end with the said yoke for swinging the same, operated at a point between its ends by the said stem and having its opposite end furnished with a pivot entering the said movement-plate between which and the spring-barrel the pivot end of the yoke is held against displacement.

2. In a stem-winding and stem-setting watch, the combination with the center-ring of the watchcase, of a pendant mounted in the said ring, a longitudinally-movable winding and setting stem located in the said pendant and having its inner end squared, a crown removably attached to the outer end of the said stem, a stop located upon the stem and engaging directly with the inner end of the pendant to limit the outward movement of the stem which is introduced into the pendant from the inside of the said center-ring, a long setting-lever pivotally mounted at one end in one of the movement-plates of the watch and engaged between its ends by the said stem, an oscillating winding and setting yoke connected with the free end of the said lever, a spring for restoring the said yoke to its winding position after it has been oscillated by the inward movement of the said stem, winding and setting wheels carried by the yoke and coacting with the dial-work and spring-barrel of the watch, a winding-pinion having a squared opening for the reception of the squared inner end of the said stem, and a winding and setting wheel in mesh with the said pinion and meshing into the winding and setting wheels carried by the said yoke.

In testimony whereof I have signed this specification in the presence of two subscribing witnesses.

WILSON E. PORTER.

Witnesses:
FREDERIC C. EARLE,
GEORGE D. SEYMOUR.